United States Patent [19]
Dai et al.

[11] Patent Number: 5,143,878
[45] Date of Patent: Sep. 1, 1992

[54] NOVEL ZEOLITE TREATING PROCESS

[75] Inventors: Pei-Shing E. Dai; David E. Sherwood, Jr., both of Port Arthur, Tex.

[73] Assignee: Texaco Inc., White Plains, N.Y.

[21] Appl. No.: 739,362

[22] Filed: Aug. 2, 1991

Related U.S. Application Data

[62] Division of Ser. No. 533,222, Jun. 4, 1990, Pat. No. 5,112,473.

[51] Int. Cl.$^5$ ............................................. B01J 29/10
[52] U.S. Cl. ........................................ 502/66; 502/79
[58] Field of Search ............................ 502/60, 66, 79

[56] References Cited

U.S. PATENT DOCUMENTS

| | | | |
|---|---|---|---|
| 4,405,503 | 9/1983 | Barclay et al. | 502/66 |
| 4,762,813 | 8/1988 | Ward | 502/66 |
| 4,816,538 | 3/1989 | Abdo | 502/66 |

OTHER PUBLICATIONS

Zeolite Chemistry and Catalysis, by Ward, ACS Monograph 171, American Chemical Soc., Washington, D.C. 1976, pp. 249-251.

*Primary Examiner*—Carl F. Dees
*Attorney, Agent, or Firm*—Robert A. Kulason; James J. O'Loughlin; Carl G. Seutter

[57] ABSTRACT

A hydrocarbon conversion process to yield product of improved properties is effected in the presence of a zeolite characterized by increased Secondary Pore Volume, decreased Lattice Constant, Secondary Pore Mode, Secondary Pore Diameter, increased Secondary Pore Volume, Surface Silicon to Aluminum Atom Ratio, and Acid Site Density.

12 Claims, No Drawings

NOVEL ZEOLITE TREATING PROCESS

This is a division of application Ser. No. 07/533,222 filed June 4, 1990 now U.S. Pat. No. 5,112,473.

FIELD OF THE INVENTINO

This invention relates to a process for treating a zeolite to modify its properties.

BACKGROUND OF THE INVENTION

As is well knwon to those skilled in the art, zeolite catalysts have been used in hydrocarbon processing. Prior art zeolites have been found to be effective as catalysts for cracking, hydrocracking, hydrosulfurization, etc. Recent trends in resid hydroprocessing demand increased conversion of feed having a boiling point above 1000° F. as well as improved hydrogenation selectivity as measured by Conradson carbon conversion and hydrodenitrogenation (HDN) of the 1000° F− products attained from cracking of the residue.

U.S. Pat. No. 4,663,025 to Phillips as assignee of Fu is directed to a catalytic cracking process carried out in the presence of a zeolite which may be partially dealuminated natural mordenite, a partially ealuminated synthetic faujasite, or a partially dealuminated synthetic mordenite. The zeolite has a unit cell size of 24.31 A to 24.42 A, a silicon to aluminum atom ratio in the framework of 8-21:1, and a surface area of 500-1000 m²/g. The zeolite has been partially dealuminated by treating with steam at 1300° F.-1500° F. for 0.5-5 hours, followed by treatment with aqueous acid such as hydrochloric acid at 180° F.-210° F. for 1-10

It is an object of this invention to provide a process for treating a zeolite catalyst to yield a novel treated zeolite catalyst which is characterized by improved properties. Other objects will be apparent to those skilled in the art.

STATEMENT OF THE INVENTION

In accordance with certain of its aspects, this invention is directed to a process of treating a charge dealuminated Y-zeolite having a silica to alumina mole ratio of about 10-120 zeolite selected from the group consisting of (i) an ammonium form of dealuminated Y-zeolite having a silica to alumina mole ratio of about 10-120, (ii) a hydrogen form of dealuminated Y-zeolite having a silica-to alumina mole ratio of about 10-120, and. (iii) a metal exchanged dealuminated Y-zeolite having a silica to alumina mole ratio of about 10-120 and a Lattice Constant of about 24.30A-24.50A which charge is particularly characterized by the presence of Secondary Pores of diameter of about 100 A-600 A which comprises contacting said charge zeolite with acidic medium at 75°-140° F. for 0.5-6 hours thereby converting said charge zeolite into an acidified zeolite characterized by (i) an increased SEcondary Pore Volume of about 0.14-0.20 cc/g, (ii) a decreased Lattice Constant of about 24.23 A-24.33 A, (iii) a Secondary Pore Mode of about 115 A-145 A, (iv) a Secondary Pore Diameter of about 100 A-600 A, and a (v) Surface Silicon to Aluminum Atom Ratio of about 24-45; and recovering said acidified zeolite characterized by (i) an increased Secondary Pore Volume of about 0.14-0.20 cc/g, (ii) a decreased Lattice Constant of about 24.23 A-24.33 A, (iii) a Secondary Pore Mode of about 115 A-145 A, (iv) a Secondary Pore Diameter of about 100 A-600 A, and a (v) Surface Silicon to Aluminum Atom Ratio of about 24-45.

In accordance with certain of its other aspects, this invention is directed to a novel acidified dealuminated Y-zeolite selected from the group consisting of (i) ammonium form of acidified dealuminated Y-zeolite having a silica to alumina mole ratio of about 10-120, (ii) a hydrogen form of acidified Y-zeolite having a silica to alumina mole ratio of about 10-120, (iii) a metal exchanged form of dealuminated Y-zeolite having a silica to alumina mole ratio of about 10-20 characterized by (i) an increased Secondary Pore Volume of about 0.10-0.20 cc/g, (ii) a decreased Lattice Constant of about 24.21 A-24.39 A, (iii) a Secondary Pore Mode of about 115 A-145 A, (iv) A Secondary Pore Diameter of about 100 A-600 A, and a (v) Surface Silicon to Aluminum Atom Ratio of about 24-45; and (vii) an Acid Site Density of about 5-16 ccNH$_3$/g zeolite.

DESCRIPTION OF THE INVENTION

The charge zeolites which may be treated by the process of this invention are typically characterized by various properties including pore size, unit cell size, silica to alumina mole ratio, etc.

Primary Pore Size—The primary pores are small pores characterized by a pore diameter of less than about 100 A, and typically 20 A-40 A, say 23 A. These small or micropores are commonly present together with super micropores having a pore diameter of 40 A-100 A, say 47 A. Pore size is measured by nitrogen desorption isotherm.

Primary Pore Volume—The volume of the primary pores (including micropores and super micropores) is typically 0.08-0.14, say 0.11 cc per gram of charge zeolite. Primary Pore Volume is measured by nitrogen desorption isotherm.

Lattice Constant—The unit cell size (or lattice constant) of the charge zeolites which may be improved by the process of this invention is typically above 24.20 A; and it may commonly be 24.30 A-24.60 A, say 24.35 A. Unit cell size is measured by X-ray diffraction.

Secondary Pore Size—The secondary pores are large pores characterized by a pore size (diameter) of greater than 100 A, and typically 100 A-600 A. Secondary pore size is measured by the nitrogen desorption isotherm.

Secondary Pore Volume—The charge zeolites which may be treated by the process of this invention are characterized by having a secondary pore volume. Typical secondary pore volumes are above 0.05 cc/g and commonly in the range of 0.05-0.15 cc/g. Secondary pore volume is measured by the nitrogen desorption isotherm.

Total Pore Volume—The total pore volume of the charge zeolites which may be treated by the process of this invention may be 0.13-0.29 cc/g, say about 0.23 cc/g (as measured by the nitrogen adsorption isotherm).

Total Surface Area—The total surface area of the charge zeolites which may be treated by the process of this invention may typically be 500-700 m²/g, say 580 m²/g (as measured by Brunauer-Emmett-Teller (BET) Technique).

Crystallinity—The crystallinity of the charge zeolites which may be treated by the process of this invention may be 70%-95%, say 87% (as measured by X-ray diffraction).

Silica-to-Alumina Mole Ratio—The silica-to-alumina mole ratio of the charge compositions which may be treated by the process of this invention may be 10-120, say 18. This is equivalent to a silicon-to-aluminum atom ratio of 5-60, say 9.

Surface Si:Al Atom Ratio—The Surface Si:Al Atom Ratio of the charge zeolite which may be treated by the process of this invention (as measured by X-ray photo electron spectroscopy) may be (e.g. for the Y-type zeolite) 4-60, say 2.0. This is the ratio which prevails over a depth of 50 A on the surface of the particle.

Acid Site Density—The acid site density of the charge zeolites which may be treated by the process of this invention may be 1-30, say 7 cc $NH_3$/gram of catalyst (as measured by temperature programmed desorption of ammonia (TPD) ).

Acid Resistance—The acid resistance of the charge zeolites which may be treated by the process of this invention may be 80%-100%, say 90% (as measured by loss of zeolite crystallinity in contact with a standard acid solution).

The charge dealuminated Y-zeolites may include a dealuminated Y-zeolite selected from the group consisting of (i) ammonium form of dealuminated Y-zeolite having a silica to alumina mole ratio of 10-120, (ii) a hydrogen form of dealuminated Y-zeolite having a silica to alumina mole ratio of 10-120, (iii) a metal exchanged dealuminated Y-zeolite having a silica to alumina mole ratio of 10-120 and a lattice constant of about 24.30-24.50 A, which charge is particularly characterized by the presence of secondary pores of diameter of about 100-600 A.

The charge dealuminated Y-zeolite may include those characterized by a silica to alumina mole ratio of 10-120, typically 10-80, say 18 and a Lattice Constant of about 24.30-24.50 A, preferably 24.30 A-24.45 A, say about 24.35 A.

Dealuminated Y-zeolites which may be employed may include ultrastable Y-zeolites, superultrastable Y-zeolite etc.

Faujasite is a natural zeolite characterized by the formula (Ca, Mg, $K_2$) 29.5 $(AlO_2)_{59}$ $(SiO_2)_{154}$. 27 $H_2O$. Z-type zeolites are high silica (dealuminated) zeolites typified by the ZSM-5 and ZSM-11 zeolites which include moieties (typified by TPA tetrapropyl ammonium) derived from quats and which may typically have the formula (Na, TPA)3 $(AlO_2)_3$ $(SiO_2)_{93}$. $16H_2O$. Ultrastable zeolites are $NH_4+$ exchanged dealuminated Y-zeolites. Superultrastable ultrastable zeolites are $H+$ form of steamed ultrastable Y-zeolites.

The charge zeolite may be preferably in the hydrogen form, the ammonium form, or more preferably in an exchanged form i.e. a form in which any alkali metal present has been exchanged for e.g. one or more rare earth metals. Alkali metal is present preferably in amouht of less than about 0.5 w %. The preferred form is the commercial hydrogen form.

Illustrative commercially available zeolites which may be treated by the process of this invention may include the following, the properties of which are set forth in the table which follows:

TABLE

Typical Charge Zeolites

A. The Valfor CP 300-35 brand of super ultrastable Y-zeolite of PQ Corp
B. The Valfor CP 304-37 brand of super ultrastable Y-zeolite of PQ Corp.

TABLE

| Property | CHARGE ZEOLITE | |
|---|---|---|
| | A | B |
| Primary Pore Size A | 85 | 39 |
| Primary Pore Volume cc/g | 0.11 | 1 |
| Lattice Constant | 24.35 | 24.37 |
| Secondary Pore Size A | none | 115 |
| Secondary Volume cc/g | 0.12 | 0.12 |
| Total Pore Volume cc/g | 0.23 | 0.23 |
| Total Surface Area m²/g | 580 | 620 |
| Crystallinity % | 87 | 74 |
| $SiO_2$ to $Al_2O_3$ Mole Ratio (XRD) | 18 | 16 |
| Acid Site Density cc/g | 6.5 | 13 |
| Acid Resistance % | — | — |

The preferred charge zeolite is a zeolite such as the CP 300-35 brand of Y-type zeolite of PQ Corp.

It is a feature of the process of this invention that the charge Y-zeolite may be contacted with acid, preferably in aqueous medium with a Bronsted acid having a PKa of less than about 5. Although it is preferred to use nitric acid which is completely dissociated, the acids which may be employed typically include those having a PKa in the range of about 1-3.

The Bronsted acids which may be employed may preferably include water-soluble inorganic acids typified by the following; (the PKa set forth for polybasic acids is that corresponding to the first ionization constant):

TABLE

| Acid | $PK_a$ |
|---|---|
| Nitric | Completely Dissociated |
| Hydrochloric | 1.0 |
| Sulfuric | Completely Dissociated |
| o-phosphoric | 2.12 |

Acidic gases such as gaseous hydrogen chloride, etc. may be employed.

Typical water-soluble organic acids which may be employed in aqueous solution may be typified by the following:

TABLE

| Acid | $PK_a$ |
|---|---|
| Citric | 3.08 |
| Acetic | 4.75 |
| Oxalic | 1.23 |
| Propionic | 4.87 |

The preferred inorganic acids include strong mineral acids such as nitric acid or hydrochloric acid. The preferred organic acids include citric acid or acetic acid. The most preferred acid is nitric acid.

The acids may be preferably employed in aqueous media in concentrations of 0.1N-2.0N, say 0.5N. Treating of the hydrothermally treated zeolites may be effected by contacting 100 parts of charge zeolite with 1000-5000 parts, say 2500 parts of 0.1N-2.0N aqueous nitric acid at 5° F.-140° F., say ambient temperature of typically 25° F. for 0.5-6 hours, say 6 hours.

At the end of the acidification operation, the zeolite particles may be separated from the aqueous acid medium and water-washed several times with water at ambient temperature. During each washing, the zeolite may contact the wash water for 0.2-2 hours, say 0.5 hours. Each washing may utilize 2500-5000 parts, say 2500 parts per 100 parts of zeolite.

The acidified zeolite may be characterized as follows:

Primary pore Size—The primary pore size is typically 20 A-100 A, say about 47 A.

Primary Pore Volume—The primary pore volume is typcially 0.09-0.14, say about 0.12 cc/g.

Unit Cell Size—The unit cell size (or lattice constant) of the treated zeolite unexpectedly shows a uniform value of typically to 24.23 A-24.33 A, say 24.25-24.27 A.

Secondary Pore Size—The secondary pore size of the treated zeolite is typically. 100 A-600 A. The Secondary Pore Mode is typically 115-145 A.

Secondary Pore Volume of the treated zeolite is 0.14-0.20, say 0.17 cc/g. It is unexpected that the secondary pore volume should iccrease by 10-70 %, say 42% over the secondary pore volume of the charge zeolite.

Total Pore Volume—The pore volume of the treated zeolite is 0.27-0.32 cc/g, say 0.30 cc/g which is unexpectedly 20%-40%, say 30% greater than the total pore volume of the charge zeolite.

Total Surface Area—The total surface area of the treated zeolite is 680-730 m$^2$/g, say 720 m$^2$/g.

Crystallinity—The crystallinity of the treated zeolite is 74%-94%, say 84%.

Silica-Alumina Ratio—The silica-to-alumina ratio of the treated zeolite is 36-60, say 46 as determined by absorption spectroscopy. This corresponds to a silicon-to-aluminum ratio of 18-30, say 23.

Surface Si:Al Atom Ratio—The surface Si:Al atom ratio is typically 24-45, say 40.

Acid Site Density—The acid site density of the treated zeolite is 1-6, say 3 ccNH$_3$/g zeolite.

Acid Resistance—The acid resistance of the treated zeolite is 85%-120%, say 100%.

It is to be noted that the acid-treated zeoite is particularly characterized by:

(i) an unexpected increase in the number of secondary pores as is evidenced by the increase in pore volume. It will be noted that the charge zeolite is characterized by a secondary pore volume of only 0.12 cc/g. The acidified zeolite is characterized by a secondary pore volume of 0.14-0.20 cc/g;

(ii) a substantially decreased lattice constant. The charge typically has a lattice constant of 24.30 A-24.640 A, say 24.35 A. The acidified zeolite has a lattice constant of 24.21 A-24.33 A, say 24.26 A;

(iii) an unexpected increase in Secondary Pore Mode. The charge typically has a Secondary Pore Mode less than 115 A and typically 85-115 A. The acidified zeolite has a Secondary Pore Mode of 115-145 A.

It is a feature of the treated zeolites of the invention (typically present in particles of particle size of 0.02-0.04 microns) that they may be mixed with suitable binders, such as silica or alumina or silica-alumina to form a mix containing 10-90 w % zeolite. This mix may be extruded, dried at 250° F.-400° F., say 350° F., calcined at 1000° F.-1400 ° F., say 1200° F. for 0.12-2 hours, say 1 hour and impregnated with metals which are useful as H-Oil catalysts such as Group VIB and Group VIII metals—typically such as Ni-Mo, Co-Mo, Ni-Mo-P, Co-Mo-P, etc. A typical such catalyst may contain 2.6 w % Ni and 10 w % Mo on a 1 mm ×6 mm particle containing 60% w alumina, 20 w % silica, and 20 w % treated zeolite.

It is also a feature of the zeolite product of this invention that it may be useful as a catalyst in hydrocarbon cracking as in a fluid catalytic cracking process wherein hydrocarbon charge, such as a gas oil, is cracked at 900° F.-1100° F., typically 960° F. at 0-20 psig, say 0 psig. It is found that the novel catalyst (typically containing a catalytically active metal such as a rare earth metal) of this invention may be particularly effective in cracking the 900+° F. ibp fraction of charge gas oils. As determined by the slurry oil in the cracked product (i.e. % of the oil boiling at least as high as 670° F.) the zeolite catalyst of this invention desirably yields crackate having typically 5% less of the slurry oil than prior art zeolites.

This is believed to be due to the presence of an increased volume of Secondary Pores (which is typically greater than 0.12 cc/g, as distinguished from prior art zeolites (which have Secondary Pore Volumes of less than 0.12 cc/g) and an increased Secondary Pore Mode which is typically 115 A-145 A as (distinguished from prior art zeolites which have a Secondary Pore Mode smaller than 100 A).

This catalyst may be used in a hydrotreating process. Typically in a hydrotreating process (typified by the H-Oil brand of process), reaction is carried out in an ebullated bed reactor containing particulate catalyst. Temperature of operation may be 650° F.-950° F., preferably 750° F.-900° F., say 850° F. at 1000-4000 psig, preferably 2000psig, say 2500 psig. Space velocity is sufficient to maintain the bed of particulate catalyst in an expanded state. Hydrogen is admitted, with the charge hydrocarbon, in amount of 1000-50,000 SCFB, preferably 5000-1 0,000 SCFB.

Typical H-Oil feed is an atmospheric reduced crude or a vacuum bottoms; and commonly 95% of the feed boils above 975° F. It typically may contain 10 w % sulfur and up to 1000 ppm metals (including nickel and vanadium).

H-Oil product is characterized by lower density and boiling point, lower sulfur content, and lower content of metals.

DESCRIPTION OF SPECIFIC EMBODIMENTS

Practice of the process of this invention will be apparent to those skilled in the art from inspection of the following wherein all parts are parts by weight unless otherwise stated. An asterisk indicates a control example.

EXAMPLE I

In this example, which represents the best mode presently known of carrying out the process of this invention, the charge zeolite is the Valfor CP 300-35 USY bran of hydrogen superultrastable Y-type zeolite of PQ Corp. This Y-zeolite is a characterized by the properties set forth in the table infra.

In this example, the zeolite (as crystals of particle size of 0.2-0.4 microns) is contacted with 0.5N aqueous nitric acid (5000 parts per 100 parts of zeolite) at 140° F. for 2 hours. The aqueous liquid is then removed and the zeolite dried for 24 hours at 250° F.

TABLE

| Property | Charge Zeolite | Acidified Zeolite |
|---|---|---|
| Primary Pore Size A | 85 | 43 |
| Primary Pore Volume cc/g | 0.11 | 0.11 |
| Unit Cell Size A | 24.35 | 24.25 |
| Secondary Pore Size A | None | 135 |
| Secondary Pore Volume cc/g | 0.12 | 0.17 |
| Secondary Pore Mode A | 0 | 135 |
| Total Pore Volume cc/g | 0.23 | 0.28 |
| Total Surface Area m$^2$/g | 580 | 730 |

TABLE-continued

| Property | Charge Zeolite | Acidified Zeolite |
|---|---|---|
| Crystallinity % | 87 | 94 |
| SiO$_2$:Al$_2$O$_3$ Ratio (XRD) | 18 | 54 |
| Acid Site Density cc NH$_3$/g | 6.5 | 2.9 |
| Surface Si:Al Ratio | 1.6 | 24 |

It should be noted that the Acidified zeolite is desirably characterized by an increase in Secondary Pore Size, Secondary Pore Volume, Total Pore Volume, and Surface Si:Al Ratio and by a desirable decrease in Lattice Constant and Acid Site Density.

Preparation of catalyst from this treated zeolite may be carried out by mixing 20 parts of zeolite and 80 parts of gamma alumina, extruding to form 1 mm × 6 mm cylinders, drying at 350° F. for 4 hours, calcining at 1200° F. for one hour, and then loading. The particles are loaded by immersing in nickel nitrate solution for 24 hours, drying at 250° F. for 4 hours, and calcining at 1200° F. for one hour. The particles are then immersed in aqueous ammonium molybdate solution for 24 hours, dried at 350° F. for 4 hours, and calcined at 1200° F. for one hour.

This catalyst may be employed in an H-Oil process to which is charged an Arabian Medium/Heavy Vacuum Resid having the following properties:

TABLE I

| Typical Petroleum Feedstock (Arabian Medium/Heavy Vacuum Resid) | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212 F. | 2430 |
| @ 250 F. | 410 |
| @ 300 F. | 117 |
| Pour Point, °F. | 110 |
| n-C$_5$ Insolubles, wt % | 28.4 |
| n-C$_7$ Insolubles, wt % | 9.96 |
| Toluene Insolubles, wt % | 0.02 |
| Asphaltenes, w % | 9.94 |
| Metals, wppm | |
| Ni | 49 |
| V | 134 |
| Fe | 10 |
| Cu | 3 |
| Na | 49 |
| Chloride, wppm | 28 |

Charge may be admitted in liquid phase at 770° F. and 2250 psig to an ebullated bed of catalyst. Space velocity LHSV is 0.56. Hydrogen is admitted in amount of 7000 SCFB.

Hydrocarbon product may be characterized by presence of 49.38 w % of liquid boiling below 1000° F.

EXAMPLES II-IX

In order to demonstrate the effect of acid treatment according to the process of this invention at various conditions, a charge dealuminated ultrastable Y-zeolite (the CP300-35 SUSY-zeolite, 1987 version, of PQ Company which has been rendered ultrastable by removing the majority of the Na cations by ion exchange with NH$_4$+ followed by calcining at 1050° F.) was acidified at various conditions at 140° F. The Total Pore Volume cc/g, Pore Mode A and the Total Surface Area m$^2$/g of the so-treated hydrothermal zeolite were measured. The untreated control was not acidified.

TABLE

| Example | Acid Treatment Conditions | TPV Total Pore Volume cc/g | Secondary Pore Mode A | Surface Area m$^2$/g |
|---|---|---|---|---|
| II* | Untreated | 0.230 | 85 | 580 |
| III* | Untreated | 0.231 | 87 | 584 |
| IV | 2.0N/0.1R/6H | 0.299 | 135 | 720 |
| V | 2.0N/0.02R/6XH | 0.307 | 130 | 719 |
| VI | 0.5N/0.02R/6H | 0.300 | 125 | 728 |
| VII | 0.5N/0.02R/6H | 0.295 | 135 | 721 |
| VIII | 2N/0.04R/4H | 0.295 | 125 | 716 |
| IX | 2N/0.02R/2H | 0.293 | 135 | 722 |
| X | 1N/0.1R/4H | 0.284 | 145 | 720 |
| XI | 0.5N/0.02R/2H | 0.278 | 135 | 731 |
| XII | 0.5N/0.4R/4H | 0.285 | 130 | 729 |
| XIII | 1N/0.04R/6H | 0.286 | 135 | 714 |
| XIV | 1N/0.02R/4H | 0.295 | 115 | 728 |
| XV | 2N/0.1R/2H | 0.278 | 125 | 706 |
| XVI | 1N/0.04R/2H | 0.281 | 125 | 716 |
| XVII | 0.5N/0.1R/2H | 0.234 | 115 | 651 |
| XVIII | 0.5N/0.1R/6H | 0.238 | 125 | 653 |

From the above table, it will be noted that it is possible (Example VII) to treat a harge zeolite for 6 hours with 0.5N nitric acid (weight ratio of zeolite to acid solution of 0.02) to increase the untreated TPV of 0.230 by about a third up to 0.295 cc/g and the Pore Mode from 85 A up to 135 A and the Surface Area from 580 up to 721 m$^2$/g.

From the data of Examples II-XVIII, the following may be noted:

(i) The Total Surface Area of the zeolites which have been acidified according to the process of this invention is, in all cases, substantially greater than is the Total Surface Area of the charge zeolite.

(ii) The Total Surface Area of the zeolites of this invention attained at all acidification conditions is uniform and 124% greater than (720/580) than that of the charge zeolite.

(iii) The Pore Mode of the zeolites treated by the process of this invention is in all cases better (i.e. higher) than the Pore Mode of the charge zeolites.

(iv) The Maximum Pore Mode of the zeolite acidified 145 A which is substantially above that (85 A) of the charge.

(v) The Total Pore Volumes of the products of this invention are substantially higher at a given temperature than is the case for a control zeolite at the same temperature.

EXAMPLES XVIII-XXXIII

In this series of Examples, the distribution of Pore Volume was determined as a function o.f acid concentration, zeolite content, and treatment time. The charge zeolite was the as received CP-300-35 hydrogen form superultrastable Y-zeolite which is a dealuminated Y-zeolite. The units of the Pore Volume Distribution are cc/g ×1000.

TABLE

| Example | Acid Treatment Conditions | Desorption Pore Vol Dist | |
|---|---|---|---|
| | | 20-100A cc/g | 100-600A cc/g |
| XIX* | Untreated | 0.11 | 0.12 |
| XX* | Untreated | 0.11 | 0.12 |
| XXI | 2N/0.02R/6H | 0.11 | 0.19 |

TABLE-continued

| Example | Acid Treatment Conditions | Desorption Pore Vol Dist | |
|---|---|---|---|
| | | 20-100A cc/g | 100-600A cc/g |
| XXII | 0.5N/0.02R/6H | 0.12 | 0.18 |
| XXIII | 2N/0.04R/4H | 0.12 | 0.18 |
| XXIV | 1N/0.1R/4H | 0.11 | 0.17 |
| XXV | 1N/0.02R/4H | 0.12 | 0.17 |
| XXVI | 0.5N/0.02R/6H | 0.13 | 0.17 |
| XXVII | 0.5N/0.2R/2H | 0.11 | 0.17 |
| XXVIII | 2N/0.02R/2H | 0.12 | 0.17 |
| XXXIX | 2N/0.1R/2H | 0.12 | 0.15 |
| XXX | 2N/0.1R/6H | 0.12 | 0.18 |
| XXXI | 1N/0.04R/2H | 0.11 | 0.17 |
| XXXII | 0.5N/0.04R/4H | 0.12 | 0.17 |
| XXXIII | 1N/0.04R/6H | 0.12 | 0.17 |
| XXXIV | 0.5N/0.1R/2H | 0.09 | 0.14 |
| XXXV | 0.5N/0.1R/6H | 0.09 | 0.15 |

From the above Tables, the following may be noted:

(i) The untreated charge zeolite of Example XIX* has a Secondary Pore (100-600 A) content of only 0.12. This may be increased to 0.19 by acid treatment. (Example XXI).

(ii) It is possible by the acidification process of this invention to attain a uniform Secondary Pore Volume of about 0.17.

(iii) It is undesirable to practice the process of this invention at a low acid concentration and high zeolite content (eg ratio of 0.1) in the acid solution as this yields a Secondary Pore Volume of less than 0.17.

EXAMPLES XXXVI

In this series of Examples, the change in various properties was measured as a function of the acid concentration, zeolite content, and acidification time. The charge zeolite is the CP 300-35 ammonium superultrastable Y-zeolite of PQ Corp.

TABLE

| Example | Acid Treatment Conditions | Zeolite Content % | Lattice Constant A | Si/Al Ratio (XRD) | Si/Al Ratio (XPS) |
|---|---|---|---|---|---|
| XXXVI* | Untreated | 87 | 24.35 | 9 | — |
| XXXVII* | Untreated | 87 | 24.35 | 9 | — |
| XXXVIII | 0.5N/0.02R/6H | 94 | 24.25 | 27 | 27 |
| XXXIX | 2N/0.1R/6H | 91 | 24.26 | 23 | 37 |
| XL | 2N/0.2R/2H | 86 | 24.26 | 23 | 39 |
| XLI | 0.5N/0.02R/6H | 84 | 24.26 | 23 | 38 |
| XLII | 2N/0.02R/2H | 84 | 24.25 | 27 | 29 |
| XLIII | 2N/0.04R/4H | 84 | 24.27 | 20 | 45 |
| XLIV | 1N/0.1R/4H | 83 | 24.27 | 20 | 37 |
| XLV | 1N 0.04R/6H | 83 | 24.25 | 27 | 41 |
| XLVI | 0.5N/0.02R/6H | 82 | 24.25 | 27 | 31 |
| XLVII | 2N/0.02R/6H | 80 | 24.25 | 27 | 42 |
| XLVIII | 1N/0.02R/4H | 77 | 24.25 | 27 | 44 |
| XLIX | 1N/0.04R/2H | 74 | 24.28 | 18 | 34 |
| L | 0.5N/0.04R/4H | 74 | 24.26 | 23 | 46 |
| LI* | 0.5N/0.1R/2H | 91 | 24.33 | 11 | 7 |
| LII* | 0.5N/0.1R/6H | 96 | 24.33 | 11 | 6 |

It should be noted that the process of this invention permits attainment of a product zeolite desirably characterized by a substantial increase in the surface Silicon to aluminum Atom Ratio. The product zeolites have a narrow distribution of lattice constants and have zeolite contents as high as those of the untreated zeolites. An improvement in zeolite content can be attained under certain conditions. This is significant because it indicates that the product zeolite is more effective when used as catalyst for conversion of gas oil to light distillate.

EXAMPLES LIII-LIV

In this series of examples, further runs were made to determine properties of acid leached products of this invention. In control Example LIII* 100 parts of charge zeolite CP300-35 were acidified with 5000 parts of 0.5N nitric acid at 140° F. for 6 hours.

TABLE

| Property | Example | |
|---|---|---|
| | LIII* | LIV |
| Surface Area m²/g | 721 | 723 |
| Zeolite Content % | 84 | 85 |
| Unit Cell Size A | 24.26 | 24.28 |
| SiO₂:Al₂O₃ Ratio XRD | 46 | 36 |
| Pore Volume cc/g × 1000 | | |
| Under 100A | 127 | 111 |
| 100°A-600A | 169 | 189 |
| Pore Mode A | 135 | 135 |
| Total Volume cc/g | 0.295 | 0.300 |
| Total Acidity ccNH₃/g | 15 | 2.8 |

From the above, it will be apparent that practice of this invention permits attainment of desirable properties:

(i) the Pore Volume in the 100-600 A (secondary pore) range increased by ca 150% (i.e. 189/120) relative to the charged zeolite;

(ii) the Pore Volume in the under 100 A (primary pore) range showed no significant change;

(iii) the Total Pore Volume increased by 30% (i.e. 0.30/23);

(iv) the Pore Mode increased by 59% (i.e. 135/85);

(v) the Total Surface Area increased by 124% (i.e. 723/584); and (vi) the Total Acidity decreased by 24% (i.e. 6.9/2.8).

EXAMPLES LV*-LVI

In this series of Examples, the procedure of Example I was followed except that the charge zeolite was the CP 304-37 brand of zeolite. In Example LVI, the charge zeolite (100 parts) was treated with 1000 parts of 2.0N nitric acid at 140° F. for 6 hours. Example LV is the untreated charge. In Example LVII, the charge (100 parts) was treated with 5000 parts of 0.5N nitric acid at 140° F. for 2 hours.

TABLE

| Property | Example | | |
|---|---|---|---|
| | LV | LVI | LVII |
| Surface Area m²/g | 620 | 684 | 706 |
| Zeolite Content % | 74 | 67 | 71 |
| Unit Cell Size A | 24.37 | 24.25 | 24.23 |
| SiO₂:Al₂O₃ Ratio XRD | 16 | 54 | 80 |
| Pore Volume (cc/g × 1000) | | | |
| Under 100A | 108 | 144 | 136 |
| 100A-600A | 121 | 143 | 135 |
| Pore Mode | 115 | 127 | 126 |
| Total Pore Volume | 0.23 | 0.29 | 0.27 |

EXAMPLE LVIII

In this example, the zeolite of Example I (2.0 parts) of particle size of about 0.02-0.04 microns is mixed with 80 parts of alumina. The mix is extruded into 1 mm × 6 mm cylinders followed by drying at 350° F. for 4 hours, calcining at 1200° F. for 1 hour and then loading the cylinders by immersing first in aqueous nickel nitrate solution for 24 hours, drying at 250° F. for 4 hours, and calcining at 1200° F. for one hour and then immersing in aqueous ammonium molybdate solution at 78° F. for 24 hours. Calcining is then effected at 1200° F. for 1 hour.

This composition is used as catalyst in the H-oil process to which is charged an Arabian Medium/Heavy Vacuum Resid having the following properties:

TABLE

Typical Petroleum Feedstock
(Arabian Medium/Heavy Vacuum Resid)

| | |
|---|---|
| API Gravity | 4.8 |
| 1000° F.+, vol % | 87.5 |
| 1000° F.+, wt % | 88.5 |
| Sulfur, wt % | 5.0 |
| Total Nitrogen, wppm | 4480 |
| Hydrogen, wt % | 10.27 |
| Carbon, wt % | 84.26 |
| Alcor MCR, wt % | 22.2 |
| Kinematic Viscosity, cSt | |
| @ 212 F. | 2430 |
| @ 250 F. | 410 |
| @ 300 F. | 117 |
| Pour point, °F. | 110 |
| n-$C_5$ Insolubles, wt % | 28.4 |
| n-$C_7$ Insolubles, wt % | 9.96 |
| Toluene Insolubles, wt % | 0.02 |
| Asphaltenes, w % | 9.94 |
| Metals, wppm | |
| Ni | 49 |
| V | 134 |
| Fe | 10 |
| Cu | 3 |
| Na | 49 |
| Chloride, wppm | 28 |

Charge may be admitted in liquid phase at 770° F. and 2250 psig to an ebullated bed of catalyst Space velocity LHSV is 0.56. Hydrogen is admitted in amount of SCFB.

Hydrocarbon product may be characterized by increased content of liquid boiling below 1000° F.

EXAMPLE LIX*-LX*

In this example, the zeolite employed is the CP300-35 brand of hydrogen exchanged super ultrastable zeolite having the properties noted supra. It is employed as a fluidized FCCU catalyst to which is charged a blend of heavy vacuum gas oil and atmospheric resid at 960° F. and 0 psig. Example LIX are sets forth control data for this catalyst.

The catalyst employed in Example LX is treated with 0.5N nitric acid in weight ratio of catalyst to acid of 0.02 for 6 hours at 140° F.

TABLE

| | Example | |
|---|---|---|
| | LIX* | LX |
| Unit Cell Size | 24.35 | 24.28 |
| Pore Mode A | 85 | 135 |
| Secondary Pore Volume (cc/g) | 0.12 | 0.19 |
| FCC-MAT Conv (w %) | 52 | 63 |
| Acid Site Density (cc$NH_3$/g) | 6.8 | 2.8 |
| Surface Si/Al atom ratio | 1.3 | 29 |
| Si/Al | 9 | 18 |

From the above it will be apparent that the novel catalyst of Example LX yields conversion of 63% while the control of Example LIX* shows only 52% conversion.

Although this invention has been illustrated by reference to specific embodiments, it will be apparent to those skilled in the art that various charges and modifications may be made which clearly fall within the scope of the invention.

What is claimed is:

1. The process of treating a charge dealuminated Y-zeolite having a silica to alumina mole ratio of about 10–120 selected from the group consisting of (i) an ammonium form of dealuminated Y-zeolite having a silica to alumina mole ratio of about 10–120, (ii) a hydrogen form of dealuminated Y-zeolite having a silica to alumina mole ratio of about 10–120, and (iii) a metal exchanged dealuminated Y-zeolite having a silica to alumina mole ratio of about 10–120 and a Lattice Constant of about 24.30 A–24.50 A which charge is characterized by the presence of Secondary Pores of diameter of about 100 A–600 A which comprises contacting said charge zeolite with acidic medium at 75° F.–140° F. for 0.5–6 hours thereby converting said charge zeolite into an acidified zeolite characterized by (i) an increased Secondary Pore Volume of about 0.14–0.20 cc/g, (ii) a decreased Lattice Constant of about 24.23 A–24.33 A, (iii) a Secondary Pore Mode of about 115 A–145 A, (iv) a Secondary Pore Diameter of about 100 A–600 A, and (v) a Surface Silicon to Aluminum Atom Ratio of about 24–45; and recovering said acidified zeolite characterized by (i) an increased Secondary Pore Volume of about 0.14–0.20 cc/g, (ii) a decreased Lattice Constant of about 24.23 A–24.33 A, (iii) a Secondary Pore Mode of about 115 A–145 A, and (v) a Surface Silicon to Aluminum Atom Ratio of about 24–45.

2. The process of treating a charge dealuminated Y-zeolite as claimed in claim 1 wherein said charge zeolite is an ammonium form dealuminated Y-zeolite having a silica to alumina mole ratio of about 10–120.

3. The process of treating a charge dealuminated Y-zeolite as claimed in claim 1 wherein said charge zeolite is a hydrogen form dealuminated Y-zeolite having a silica to alumina mole ratio of about 10–120.

4. The process of treating a charge dealuminated Y-zeolite as claimed in claim 1 wherein said charge zeolite is a metal exchanged dealuminated Y-zeolite having a silica to alumina mole ratio of about 10–120.

5. The process of treating a charge dealuminated Y-zeolite as claimed in claim 1 wherein said contacting with acidic medium is carried out at ambient temperature.

6. The process of treating a charge dealuminated Y-zeolite as claimed in claim 1 wherein said acidic medium is an aqueous solution of an organic acid.

7. The process of treating a charge dealuminated Y-zeolite as claimed in claim 1 wherein said acidic medium is an aqueous solution of an inorganic acid.

8. The process of treating a charge dealuminated Y-zeolite as claimed in claim 1 wherein said acidic medium is an aqueous solution of nitric acid, carried out for about 2–6 hours.

9. The process of treating a charge dealuminated Y-zeolite in hydrogen form having a silica to alumina mole ratio of about 10–120 and a lattice constant of about 24.30 A–24.50 A which comprises contacting said charge zeolite with an acidic medium at 75° F.–140° F. for 0.5–6 hours thereby converting said charge zeolite into an acidified zeolite characterized by (i) an increased Secondary Pore Volume of about 0.14–0.20 cc/g, (ii) a decreased Lattice Constant of about 24.23 A–24.33 A, (iii) a Secondary Pore Mode of about 100 A–325 A, (iv) a Secondary Pore Diameter of about 100 A–600 A, and (v) a Surface Silicon to Aluminum Atom Ratio of about 24–45; and recovering said acidified zeolite characterized by (i) an increased Secondary Pore Volume of about 0.14–0.20 cc/g, (ii) a decreased Lattice Constant of about 24.23 A–24.33 A, (iii) a Secondary Pore Mode of about 115 A–145 A, (iv) a Secondary Pore Diameter of about 100 A–600 A, and a Surface Silicon to Aluminum Atom Ratio of about 24–45.

10. A novel acidified dealuminated Y-zeolite having a silica to alumina mole ratio of about 10–120 selected from the group consisting of (i) an ammonium form of dealuminated Y-zeolite having a silica to alumina mole ratio of about 10–120, (ii) a hydrogen form of having a silica to alumina mole ratio of about 10–120, and (iii) a metal exchanged dealuminated Y-zeolite having a silica to alumina mole ratio of about 10–120 characterized by (i) an increased Secondary Pore Volume of about 0.14–0.20 cc/g, (ii) a decreased Lattice Constant of about 24.23 A–24.33 A, (iii) a Secondary Pore Mode of about 115 A–145 A, (iv) a Secondary Pore Diameter of about 100 A–600 A, (v) a surface Silicon to Aluminum Atom Ratio of about 24–45, and (vi) an Acid Site Density of about 1–5 cc $NH_3$/g cat.

11. A novel catalyst comprising an acidified dealuminated Y-zeolite having a silica to alumina mole ratio of about 10–120 selected from the group consisting of (i) an ammonium form of dealuminated Y-zeolite having a silica to alumina mole ratio of about 10–120, (ii) a hydrogen form of dealuminated Y-zeolite having a silica to alumina mole ratio of about 10–120, and (iii) a metal exchanged dealuminated Y-zeolite having a silica to alumina mole ratio of about 10–120 characterized by (i) an increased Secondary Pore Volume of about 0.14–0.20 cc/g, (ii) a decreased Lattice Constant of about 24.23 A–-24 33 A, (iii) a Secondary Pore Mode of about 115 A–145 A, (iv) a Secondary Pore Diameter of about 100 A–600 A, (v) a surface Silicon to Aluminum Atom Ratio of about 20–50, and (vi) an Acid Site Density of about 1–5 cc $NH_3$/g cat;

(i) a binder; and
(ii) a catalytic metal.

12. A novel catalyst comprising (i) an acidified zeolite prepared from a charge zeolite selected from the group consisting of (i) an ammonium form of dealuminated Y-zeolite having a silica to alumina mole ratio of about 10–120, (ii) a hydrogen form of dealuminated Y-zeolite having a silica to alumina mole ratio of about 10–120, and (iii) a metal exchanged dealuminated Y-zeolite having a silica to alumina mole ratio of about 10–120 and a Lattice Constant of about 24.30 A–24.50 A which acidified zeolite charge is characterized by the presence of Secondary Pores of diameter of about 100 A–600 A which has been prepared by the process which comprises contacting said charge zeolite with acidic medium at 75° F.–140° F. for 0.5–6 hours thereby converting said charge zeolite into an acidified zeolite characterized by (i) an increased Secondary Pore Volume of about 0.114–0.20 cc/g, (ii) a decreased Lattice Constant of about 24.23 A–24.33 A, (iii) a Secondary Pore Mode of about 115 A–145 A, (iv) a Secondary Pore Diameter of about 100 A–600 A, and (v) a Surface Silicon to Aluminum Atom Ratio of about 24–45; and recovering said acidified zeolite characterized by (i) an increased Secondary Pore Volume of about 0.14–0.20 cc/g, (ii) a decreased Lattice Constant of about 24.23 A–24.33 A, (iii) a Secondary Pore Mode of about 115 A–145 A, and (v) a Surface Silicon to Aluminum Atom Ratio of about 24–45 ii; a binder;
(iii) at least one Group VIB metal; and
(iv) at least one non-noble Group VIII metal.

* * * * *